United States Patent
Choi et al.

(10) Patent No.: US 9,624,332 B2
(45) Date of Patent: Apr. 18, 2017

(54) GRAFT MONOMER COMPOSITION FOR THERMOPLASTIC TRANSPARENT RESIN, COMPOSITION FOR THERMOPLASTIC TRANSPARENT RESIN USING THE SAME, AND THERMOPLASTIC TRANSPARENT RESIN HAVING GOOD TRANSPARENCY AND COLOR

(75) Inventors: Jeong-Su Choi, Daejeon (KR);
Keun-Hoon Yoo, Seoul (KR);
Hyong-Min Bahn, Busan (KR);
Won-Seok Lee, Daejeon (KR);
Seok-Goo Jang, Yeosu-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/996,462

(22) PCT Filed: Dec. 23, 2011

(86) PCT No.: PCT/KR2011/010019
§ 371 (c)(1),
(2), (4) Date: Jun. 20, 2013

(87) PCT Pub. No.: WO2012/087056
PCT Pub. Date: Jun. 28, 2012

(65) Prior Publication Data
US 2013/0274416 A1    Oct. 17, 2013

(30) Foreign Application Priority Data

Dec. 23, 2010  (KR) .................. 10-2010-0133686

(51) Int. Cl.
*C08F 279/02* (2006.01)
*C08L 51/04* (2006.01)
*C08L 53/02* (2006.01)
*C08L 55/02* (2006.01)

(52) U.S. Cl.
CPC ............ *C08F 279/02* (2013.01); *C08L 51/04* (2013.01); *C08L 53/02* (2013.01); *C08L 55/02* (2013.01)

(58) Field of Classification Search
CPC ........ C08L 51/04; C08L 55/02; C08F 253/00; C08F 279/00; C08F 279/02
USPC ......... 525/70, 78, 80, 83, 84, 298, 302, 303, 525/308, 310, 312, 902
See application file for complete search history.

(56) References Cited

U.S. PATENT DOCUMENTS

| 3,068,183 | A * | 12/1962 | Strolle ..................... 524/310 |
| 3,328,488 | A * | 6/1967 | Delacretaz ............ C08F 279/02 525/310 |
| 6,448,342 | B2 * | 9/2002 | Kurata et al. ................. 525/243 |
| 7,579,406 | B2 * | 8/2009 | Choi ..................... C08F 285/00 525/70 |
| 2007/0078221 | A1 * | 4/2007 | Choi et al. ..................... 525/70 |

FOREIGN PATENT DOCUMENTS

| CN | 1320649 A | 11/2001 |
| KR | 10-1997-0009230 | 6/1997 |
| KR | 10-0360987 | 11/2002 |
| KR | 10-0423873 | 3/2004 |
| KR | 10-0600318 | 7/2006 |
| KR | 10-0626954 | 9/2006 |
| KR | 10-0960621 | 6/2010 |

OTHER PUBLICATIONS

Machine translation of KR10-0600318.*
Polethylene Glycol diacrylate product information downloaded Sep. 15, 2016 from http://www.chemicalland21.com/industrialchem/functional%20Monomer/POLYETHYLENE%20GLYCOL%20DIACRYLATE.htm.*
Ethoxyethoxy ethyl Acrylate product information. downloaded from http://www.chemicalbook.com/ChemicalProductProperty__EN__CB6305059.htm Sep. 14, 2016.*
Methacrylic acid product information downloaded from http://www.mgc.co.jp/eng/products/lm/08.html Sep. 14, 2016.*
Acrylic acid material safety data sheet downloaded on Sep. 14, 2016 from http://msdssearch.dow.com/PublishedLiteratureDOWCOM/dh__0933/0901b80380933166.pdf?filepath=acrylates/pdfs/noreg/745-00006.pdf&fromPage=GetDoc.*
Acrylic acid refractive index downloaded from http://hbcponline.com/faces/documents/15__02/15__02__0001.xhtml?search=true on Sep. 14, 2016.*

* cited by examiner

*Primary Examiner* — Irina S Zemel
*Assistant Examiner* — Jeffrey Lenihan
(74) *Attorney, Agent, or Firm* — Dentons US LLP

(57) ABSTRACT

Disclosed is a graft monomer composition for thermoplastic transparent resins, a composition for thermoplastic transparent resins using the same and a thermoplastic transparent resin that exhibits superior transparency and color at low rubber contents. According to the graft monomer composition, the composition for thermoplastic transparent resins and the thermoplastic transparent resin, although the content of rubber in final products increases or the content of rubber in graft copolymers in the preparation of final products increases, the copolymer surrounds the surface of rubber well, thus reducing haze, considerably improving transparency and exhibiting excellent natural color.

6 Claims, No Drawings

GRAFT MONOMER COMPOSITION FOR THERMOPLASTIC TRANSPARENT RESIN, COMPOSITION FOR THERMOPLASTIC TRANSPARENT RESIN USING THE SAME, AND THERMOPLASTIC TRANSPARENT RESIN HAVING GOOD TRANSPARENCY AND COLOR

This application is a National Phase Application of International Application No. PCT/KR2011/010019, filed Dec. 23, 2011, and claims the benefit of Korean Application No. 10-2010-0133686 filed on Dec. 23, 2010, all of which are hereby incorporated by reference in their entirety for all purposes as if fully set forth herein

TECHNICAL FIELD

The present invention relates to a graft monomer composition for thermoplastic transparent resins, a composition for thermoplastic transparent resins using the same and a thermoplastic transparent resin that exhibits superior transparency and color at low rubber contents. More specifically, the present invention relates to a graft monomer composition for thermoplastic transparent resins, a composition for thermoplastic transparent resins using the same and a thermoplastic transparent resin that exhibits superior transparency and color due to low rubber contents, wherein although the content of rubber in final products increases or the content of rubber in graft copolymers in the preparation of final products increases, the copolymer surrounds the surface of rubber well, thus considerably reducing haze, considerably improving transparency and exhibiting excellent natural color.

BACKGROUND ART

In recent years, industrial enhancement and great product differentiation have brought about a great deal of variation in product design. Color diversification and transparent designs have attracted considerable attention. Variation in designs requires variation in raw materials. As a result, a great deal of research into transparent materials is actively underway.

For this reason, techniques for imparting transparency by incorporating acrylic acid alkyl ester or methacrylic acid alkyl ester monomers into an acrylonitrile-butadiene-styrene (ABS) resin that exhibits superior impact resistance, chemical resistance, processability and the like have been developed.

For example, Korean Patent No. 0360987 or 0423873 discloses a transparent resin obtained by graft-copolymerizing methyl methacrylate-styrene-acrylonitrile with a conjugated diene rubber. With respect to such a transparent resin, in order to avoid haze during processing, the methyl methacrylate-styrene-acrylonitrile copolymer serving as a hard shell should surround the rubber well. When the hard shell, methyl methacrylate-styrene-acrylonitrile copolymer does not surround the rubber well, the shape of the rubber is deformed and the surface thereof becomes rough due to shear occurring during processing, thus causing occurrence of haze and deterioration in transparency.

This has negative effects on color, thus causing discoloration or formation of flow marks. As the transparent ABS market expands, products with considerably high impact strength are required. Accordingly, there is a need for development of products containing a high amount of rubber.

In addition, attempts to improve graft copolymers having rubber contents are actively underway from the viewpoint of preparation advantages in that the preparation process is efficient and preparation costs are reduced when graft copolymers having a high content of rubber are used.

However, approaches to increase the content of rubber in final products or increase the content of rubber in the preparation process disadvantageously do not surround the surface of rubber well, thus obtaining products with deteriorated transparency and poor color.

DISCLOSURE

Technical Problem

In order to solve the afore-mentioned problems of the prior art, the inventors of the present invention have performed intensive research into surrounding the surface of rubber well in spite of increasing the content of rubber in final products or the content of rubber in graft copolymers during preparation and, as a result, completed the present invention.

Therefore, the present invention has been made in view of the problems and it is one object of the present invention to provide a graft monomer composition for thermoplastic transparent resins that exhibits remarkably reduced haze and high transparency regardless of rubber content and enables the surface of rubber to be surrounded well in spite of increasing the content of rubber in final products or the content of rubber in graft copolymers during preparation.

It is another object of the present invention to provide a thermoplastic transparent resin that exhibits superior transparency, impact strength and color at low rubber contents by setting a suitable composition using the composition without increasing the content of rubber.

Technical Solution

Accordingly, in accordance with one aspect of the present invention, provided is a graft monomer composition for thermoplastic transparent resins comprising: a (meth)acrylic acid alkyl ester monomer; an aromatic vinyl monomer; and a hydrophilic monomer.

In accordance with another aspect of the present invention, provided is a composition for thermoplastic transparent resins prepared by mixing the graft monomer composition with a predetermined content of conjugated diene rubber latex.

In addition, a thermoplastic transparent resin that exhibits superior transparency and color at low rubber contents is obtained from a graft copolymer alone obtained by graft copolymerizing the composition for thermoplastic transparent resins or a mixture of the graft copolymer with a secondary copolymer.

Advantageous Effects

According to the present invention, although the content of rubber in final products increases or the content of rubber in graft copolymers in the preparation of final products increases, the copolymer surrounds the surface of rubber well, thus advantageously reducing haze, considerably improving transparency and exhibiting excellent natural color.

BEST MODE

Hereinafter, the present invention will be described in more detail.

As herein used, the term "a graft monomer composition for thermoplastic transparent resins" refers to a monomer mixture excluding a conjugated diene rubber polymer in a thermoplastic transparent resin composition.

In addition, as herein used, the term "hydrophilic monomer" refers to a hydrophilic monomer that has a solubility in water of 5% or more. Specifically, the hydrophilic monomer is more preferably one or more selected from monomers that have three or more ethylene oxide groups or one carboxyl group, together with containing ethylenic double bonds.

The present invention uses a monomer that has three or more ethylene oxide groups or one carboxyl group and contains an ethylenic double bond, thereby solving problems of the prior art in which the grafted copolymer does not sufficiently surround the rubber component, and the rubber is dented and deformed due to shear during processing and a haze value is increased, when the content of rubber in final products is high or the content of rubber is high during graft polymerization, and remarkably reducing haze although the content of rubber in final products is high or the content of rubber is high during graft polymerization.

The graft monomer composition for thermoplastic transparent resins comprises a (meth)acrylic acid alkyl ester monomer, an aromatic vinyl monomer, and a hydrophilic monomer.

The (meth)acrylic acid alkyl ester monomer is one or more selected from (meth)acrylic acid methyl ester, (meth)acrylic acid ethyl ester, (meth)acrylic acid propyl ester, (meth)acrylic acid 2-ethylhexyl ester, (meth)acrylic acid decyl ester and (meth)acrylic acid lauryl ester and is particularly preferably methyl methacrylate.

In addition, the aromatic vinyl monomer is one or more selected from styrene, α-methylstyrene, p-methylstyrene and vinyl toluene and is particularly preferably styrene.

Furthermore, the graft monomer composition optionally contains a vinyl cyan monomer. When the vinyl cyan monomer is added, an MABS resin can be prepared and when the vinyl cyan monomer is not added, an MBS resin is prepared. The vinyl cyan monomer is acrylonitrile, methacrylonitrile, ethacrylonitrile or a combination thereof.

In addition, as a hydrophilic monomer that is preferably used in the present invention, the monomers that has three or more ethylene oxide groups or one carboxyl group, together with containing ethylenic double bonds are selected from ethoxyethoxy ethyl acrylate, ethoxy triethylene glycol methacrylate, polyethylene glycol (400) monomethyl ether acrylate, polyethylene glycol (1000) monomethyl ether acrylate, polyethylene glycol (400) monomethyl ether methacrylate, polyethylene glycol (1000) monomethyl ether methacrylate, polyethylene glycol dimethacrylate, polyethylene glycol diacrylate, polyethylene glycol allyl acrylate, polyethylene glycol monoacrylate, polyethylene glycol monomethacrylate, polyethylene glycol monoallyl and (meth)acrylic acid.

According to the present invention, it can be seen that, as apparent from the following Examples, a measured haze value in a case in which a specific hydrophilic monomer of the present invention is not used (Comparative Example 3) is 15.4, which is considerably low, as compared to the haze value of 0.6 to 1.9 in cases in which the specific hydrophilic monomer of the present invention is used (Examples 1 to 4).

The present invention is characterized by suitable control of the index of refraction in addition to use of the hydrophilic monomer. That is, components and contents thereof are controlled such that the difference in index of refraction between a conjugated diene-based rubber polymer used as a main chain of a graft polymer, and a mixture of a (meth) acrylic acid alkyl ester monomer, an aromatic vinyl monomer and a hydrophilic monomer, graft polymerized therewith is adjusted to a level lower than 0.005, preferably, to zero. The reason for this is that when the difference in index of refraction is 0.005 or more, the haze value is undesirable, such that the prepared thermoplastic transparent resin does not exhibit transparency.

For reference, the index of refraction is calculated by the following equation:

$$RI = \Sigma Wti * RIi \qquad \text{[Equation 1]}$$

(wherein Wti is a weight fraction of each component of copolymer (%) and RIi is an index of refraction of polymer of each component of copolymer).

When the indexes of refraction of monomers (polymer) used for the following Examples are calculated using the equation above, butadiene has an index of refraction of 1.518, methyl methacrylate has an index of refraction of 1.49, styrene has an index of refraction of 1.59, acrylonitrile has an index of refraction of 1.52, acrylic acid has an index of refraction of 1.527, and polyethylene glycol monomethacrylate has an index of refraction of 1.49 to 1.52.

The conjugated diene rubber latex is a polymer of a conjugated monomer that has a structure in which a double bond and a single bond are alternately arranged.

Such conjugated diene rubber latex is a butadiene polymer, a butadiene-styrene copolymer (SBR), a butadiene-acrylonitrile copolymer (NBR), an ethylene-propylene copolymer (EPIM) or a polymer produced therefrom. In particular, the butadiene polymer or butadiene-styrene copolymer is preferred.

In order to obtain a difference in index of refraction, the composition of the present invention comprises 5 to 40 parts by weight of the conjugated diene rubber latex, 20 to 75 parts by weight of the (meth)acrylic acid alkyl ester monomer, 10 to 50 parts by weight of the aromatic vinyl monomer and 0.05 to 10 parts by weight of the hydrophilic monomer, and optionally comprises 0.05 to 10 parts by weight of a vinyl cyan monomer.

When the conjugated diene rubber latex is present in an amount lower than 5 parts by weight based on total 100 parts by weight of the resin composition, the thermoplastic transparent resin is readily broken due to low impact resistance and when the conjugated diene rubber latex is present in an amount higher than 40 parts by weight, processing of the transparent resin composition is difficult and transparency is deteriorated. Accordingly, by controlling the content of the conjugated diene rubber latex within 40 parts by weight based on the total weight of the resin composition, no technique for increasing the content of rubber is used for actual preparation.

In addition, when the content of the methacrylic acid alkyl ester monomer or acrylic acid alkyl ester monomer is out of the range of 20 to 75 parts by weight, based on total 100 parts by weight of the resin composition, there is a difference between the index of refraction of graft polymer prepared from the monomer mixture and the index of refraction of the conjugated diene rubber resin, thus affecting transparency of the thermoplastic transparent resin. Accordingly, the content of the meth(acrylic) acid alkyl ester monomer is preferably 20 to 75 parts by weight, based on total 100 parts by weight of the resin composition.

Furthermore, the aromatic vinyl monomer is selected from styrene, α-methylstyrene, p-methylstyrene, vinyltoluene and combinations thereof. Among these, styrene is preferred. When the content of the aromatic vinyl monomer is out of 10 to 50 parts by weight, based on total 100 parts by weight of the resin composition, there is a difference between the index of refraction of the graft polymer prepared from the monomer mixture and the index of refraction of the conjugated diene rubber resin, thus affecting transparency of the thermoplastic transparent resin. Accordingly, the content of the aromatic vinyl monomer is preferably 10 to 50 parts by weight, based on total 100 parts by weight of the resin composition.

Furthermore, in a case in which a vinyl cyan monomer is added in order to prepare MASB, when the content of the vinyl cyan monomer is lower than 0.5 part by weight based on total 100 parts by weight of the resin composition, addition effects are not sufficient and when the content exceeds 10 parts by weight, yellowing occurs, thus having an adverse effect on the color of final products. Accordingly, the vinyl cyan monomer is preferably added in an amount of 0.5 to 10 parts by weight, for the preparation of MABS, based on total 100 parts by weight of the resin composition.

In addition, the type and content of hydrophilic monomer also affect the present invention. That is, when the hydrophilic monomer is added in an amount higher than 10 parts by weight, based on total 100 parts by weight of the resin composition, latex stability is deteriorated during graft copolymerization and polymerization is difficult and when the hydrophilic monomer is added in an amount lower than 0.05 part by weight, disadvantageously, addition effects of the monomer cannot be obtained and color and transparency are not improved. The hydrophilic monomer is preferably used in an amount of 0.05 to 10 parts by weight.

Preparation of a composition for thermoplastic transparent resins using the graft monomer composition for thermoplastic transparent resins and preparation of a thermoplastic transparent resin that exhibits superior transparency and color although it has a low content of rubber from the composition will be described in detail.

That is, the graft monomer composition is mixed with a specific content of conjugated diene rubber latex to obtain a composition for thermoplastic transparent resins.

As mentioned above, mixing is carried out under the condition, that the conjugated diene rubber latex is present in 5 to 40 parts by weight, preferably 15 to 25 parts by weight, the (meth)acrylic acid alkyl ester monomer is present in 20 to 75 parts by weight, preferably 50 to 60 parts by weight, the aromatic vinyl monomer is present in 10 to 50 parts by weight, preferably 15 to 25 parts by weight, and the hydrophilic monomer is present in 0.05 to 10 parts by weight, preferably 1 to 4 parts by weight, and furthermore, a vinyl cyan monomer is optionally present in 0.05 to 10 parts by weight, preferably 1 to 4 parts by weight.

Furthermore, the thermoplastic transparent resin that exhibits superior transparency and color in spite of low rubber contents is prepared from a graft copolymer obtained by graft copolymerizing a composition for thermoplastic transparent resins, or a mixture of the graft copolymer with a second copolymer.

Specifically, examples of useful graft copolymerization include emulsion polymerization, bulk polymerization, solution polymerization, suspension polymerization and the like. For example, the thermoplastic transparent resin is prepared by emulsion polymerization alone.

As mentioned above, the graft copolymer is obtained by graft copolymerizing 5 to 40 parts by weight (preferably 15 to 25 parts by weight) of the conjugated diene rubber latex, 20 to 75 parts by weight (preferably 50 to 60 parts by weight) of the (meth)acrylic acid alkyl ester monomer, 10 to 50 parts by weight (preferably 15 to parts by weight) of the aromatic vinyl monomer, and 0.05 to 10 parts by weight (preferably 1 to 4 parts by weight) of the hydrophilic monomer, and furthermore, optionally, 0.05 to 10 parts by weight (preferably 1 to 4 parts by weight) of the vinyl cyan monomer.

Graft addition of respective components is carried out by simultaneously adding the components, or adding the entity or a part thereof continuously (sequentially). In particular, the hydrophilic monomer may be added together with other monomers after kneading the monomers, or simultaneously or separately added at the beginning, middle or latter stage of reaction.

The graft copolymer obtained by the method is a latex which is obtained in the form of a dried powder by coagulation, dehydration and drying processes. Examples of the coagulant used for coagulation include salts such as calcium chloride, magnesium sulfate, aluminum sulfate and acids such as sulfuric acid, nitric acid and hydrochloric acid and mixtures thereof.

Examples of the emulsifying agent used for emulsion polymerization of the present invention include, but are not limited to, sodium alkylbenzene sulfonate, potassium alkylbenzene sulfonate, potassium alkylcarboxylate, sodium alkylcarboxylate, potassium oleate, sodium oleate, sodium alkylsulfate, potassium alkylsulfate, sodium alkyldicarboxylate, potassium alkyldicarboxylate, sodium alkylether sulfonate, potassium alkylether sulfonate, sodium alkylethersulfate, potassium alkylethersulfate, ammonium allyloxynonylphenoxypropan-2-yloxymethylsulfate and commercially available reactive emulsifying agents such as SE10N, BC-10, BC-20, HS10, Hitenol KH10, PD-104 and the like. The emulsifying agent is preferably used in an amount of 0.1 to 5 parts by weight, more preferably, 0.15 to 2 parts by weight, based on total 100 parts by weight of the monomer constituting the graft copolymer in order to control hydrolysis of the polymer.

The polymerization initiator used in the present invention is not limited, is selected from sodium persulfate, potassium persulfate, ammonium persulfate, cumene hydroperoxide, benzoyl peroxide, azobisisobutylonitrile, 3,5-diisopropyl benzene hydroperoxide and a combination thereof and is used in an amount of 0.02 part by weight to 1 part by weight, based on 100 parts by weight of the total monomers constituting the copolymer.

As the molecular weight modifier used in the present invention, one or more selected from t-dodecyl mercaptan, n-dodecyl mercaptan, alphamethyl styrene dimer and the like are used in an amount of 0.1 part by weight to 1 part by weight, based on 100 parts by weight of the total monomers constituting respective copolymers, although the present invention is not limited thereto.

The composition of the present invention may further comprise other additives such as a heat stabilizer, a UV stabilizer, a lubricant or the like so long as physical properties are not impaired. The composition is homogeneously dispersed using a single screw extruder, a twin screw extruder, a Banbury mixer or the like. Then, the composition passes through a water bath and is cut to prepare a pellet-type transparent resin.

The graft copolymer thus prepared exclusively constitutes a thermoplastic transparent resin (MABS or MBS resin) that exhibits superior transparency and color properties although it contains a small amount of rubber.

Meanwhile, a thermoplastic transparent resin that exhibits superior transparency, color and impact strength in spite of low rubber contents can be obtained by mixing the graft copolymer with a secondary copolymer (MSAN resin) obtained by bulk polymerization, suspension polymerization or solution polymerization using the graft monomer composition for thermoplastic transparent resins.

Generally, a thermoplastic transparent resin is prepared by mixing an MABS resin, an MBS resin and a secondary copolymer (MSAN resin) that have a high rubber content in order to obtain desired process efficiency and production efficiency.

When the secondary copolymer (MSAN resin) is mixed at a suitable ratio, the graft copolymer can exhibit desired physical properties such as impact strength and processability.

Specifically, the composition for thermoplastic transparent resins mixed with the secondary copolymer is prepared by mixing 5 to 70 parts by weight, preferably 50 to 60 parts by weight of a conjugated diene rubber latex, 10 to 75 parts by weight, preferably 28 to 34 parts by weight of a (meth) acrylic acid alkyl ester monomer, and 5 to 50 parts by weight, preferably 10 to 12 parts by weight of the aromatic vinyl monomer, and optionally, 0.05 to 5 parts by weight, preferably 0.5 to 2 parts by weight of the hydrophilic monomer, and furthermore, optionally, 0.05 to 10 parts by weight, preferably 2.5 to 3 parts by weight of a vinyl cyan monomer.

The secondary copolymer (MSAN resin), as the graft copolymer thus obtained, mixed with an MABS or MBS resin is prepared by mixing 20 to 75 parts by weight, preferably 65 to 70 parts by weight of the (meth)acrylic acid alkyl ester monomer, and 10 to 50 parts by weight, preferably 20 to 30 parts by weight of the aromatic vinyl monomer, and furthermore, optionally, 0.05 to 10 parts by weight, preferably 7 to 10 parts by weight of a vinyl cyan monomer, and furthermore, optionally, 0.05 to 10 parts by weight, preferably 0.5 to 4 parts by weight of a hydrophilic monomer. The secondary copolymer is prepared in the form of a copolymer using one selected from among various polymerization methods such as emulsion polymerization, bulk polymerization, solution polymerization and suspension polymerization.

A mixing ratio of the graft copolymer (MABS or MBS resin) and the secondary copolymer (MSAN resin) is 10:90 to 90:10, preferably 20:80 to 30:70 on the basis of weight ratio, in terms of improvement in physical properties of the resin and compatibility.

MODE FOR INVENTION

Hereinafter, preferred examples of the present invention will be described for better understanding, but are provided only for illustrative purposes, those skilled in the art will appreciate that various modifications, additions and substitutions are possible, without departing from the scope and spirit of the invention as disclosed in the accompanying claims.

Preparation Example 1

Preparation of MABS (1)

100 parts by weight of ion exchange water, 1 part by weight of sodium dodecylbenzene sulfonate as an emulsifying agent, 34 parts by weight of methyl methacrylate, 12 parts by weight of styrene, 3 parts by weight of acrylonitrile, 1 part by weight of methacrylic acid, 0.5 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 50 parts by weight of a polybutadiene latex polymer (gel content of 90% and average particle size of 1500 Å) at 75° C. for 3 hours and the reaction was performed. After the reaction, the reaction solution was heated to 80° C. and aged for one hour and the reaction was finished. At this time, a polymerization conversion ratio was 98.5% and coagulated solid content was 0.05%.

Then, the reaction solution was coagulated with an aqueous calcium chloride solution and washed to obtain a powdery thermoplastic transparent resin. The thermoplastic transparent resin thus obtained had an index of refraction of 1.517 and a weight average molecular weight of 90,000.

Preparation Example 2

Preparation of MABS (2)

100 parts by weight of ion exchange water, 1 part by weight of sodium dodecylbenzene sulfonate as an emulsifying agent, 34 parts by weight of methyl methacrylate, 12 parts by weight of styrene, 2.5 parts by weight of acrylonitrile, 0.5 parts by weight of polyethylene glycol (1000) monomethyl ether methacrylate, 1 part by weight of methacrylic acid, 0.5 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 50 parts by weight of a polybutadiene latex polymer (gel content of 90% and average particle size of 1500 Å) at 75° C. for 3 hours and the components were reacted. After the reaction, the reaction solution was heated to 80° C. and aged for one hour and the reaction was finished. At this time, a polymerization conversion ratio was 98.5% and coagulated solid content was 0.05%.

Then, the reaction solution was coagulated with an aqueous calcium chloride solution and washed to obtain a powdery thermoplastic transparent resin. The thermoplastic transparent resin thus obtained had an index of refraction of 1.518 and a weight average molecular weight of 90,000.

Preparation Example 3

Preparation of MABS (3)

100 parts by weight of ion exchange water, 1 part by weight of sodium dodecylbenzene sulfonate as an emulsifying agent, 55 parts by weight of methyl methacrylate, 20 parts by weight of styrene, 3 parts by weight of acrylonitrile, 2 parts by weight of polyethylene glycol (400) monomethyl ether acrylate, 0.5 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 20 parts by weight of a polybutadiene latex polymer (gel content of 70% and average particle size of 3000 Å) at 75° C. for 5 hours and the components were reacted. After the reaction, the reaction solution was heated to 80° C. and aged for one hour and the reaction was finished. At this time, a polymerization conversion ratio was 98.0% and coagulated solid content was 0.3%.

Then, the reaction solution was coagulated with an aqueous calcium chloride solution and washed to obtain a powdery thermoplastic transparent resin. The thermoplastic transparent resin thus obtained had an index of refraction of 1.518 and a weight average molecular weight of 100,000.

Preparation Example 4

Preparation of MABS (4)

100 parts by weight of ion exchange water, 1 part by weight of sodium dodecylbenzene sulfonate as an emulsifying agent, 57 parts by weight of methyl methacrylate, 20 parts by weight of styrene, 3 parts by weight of acrylonitrile, 0.5 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 20 parts by weight of a polybutadiene latex polymer (gel content of 70% and average particle size of 3000 Å) at 75° C. for 5 hours and the components were reacted. After the reaction, the reaction solution was heated to 80° C. and aged for one hour and the reaction was finished. At this time, a polymerization conversion ratio was 98.0% and coagulated solid content was 0.2%.

Then, the reaction solution was coagulated with an aqueous calcium chloride solution and washed to obtain a powdery thermoplastic transparent resin. The thermoplastic transparent resin thus obtained had n index of refraction of 1.518 and a weight average molecular weight of 100,000.

Preparation Example 5

Preparation of MABS (5)

100 parts by weight of ion exchange water, 1 part by weight of sodium dodecylbenzene sulfonate as an emulsifying agent, 18 parts by weight of methyl methacrylate, 55 parts by weight of styrene, 5 parts by weight of acrylonitrile, 2 parts by weight of polyethylene glycol (1000) monomethyl ether acrylate, 0.5 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 20 parts by weight of a polybutadiene latex polymer (gel content of 70% and average particle size of 3000 Å) at 75° C. for 5 hours and the components were reacted. After reaction, the reaction solution was heated to 80° C. and aged for one hour and the reaction was finished. At this time, a polymerization conversion ratio was 98.0% and coagulated solid content was 0.3%.

Then, the reaction solution was coagulated with an aqueous calcium chloride solution and washed to obtain a powdery thermoplastic transparent resin. The thermoplastic transparent resin thus obtained had an index of refraction of 1.56 and a weight average molecular weight of 100,000.

Preparation Example 6

Preparation of MBS (1)

100 parts by weight of ion exchange water, 1 part by weight of sodium dodecylbenzene sulfonate as an emulsifying agent, 28 parts by weight of methyl methacrylate, 10 parts by weight of styrene, 1 part by weight of polyethylene glycol diacrylate, 1 part by weight of acrylic acid, 0.4 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 60 parts by weight of a polybutadiene latex polymer (gel content of 70% and average particle size of 3000 Å) at 75° C. for 3 hours and the components were reacted. After reaction, the reaction solution was heated to 80° C. and aged for one hour and the reaction was finished. At this time, a polymerization conversion ratio was 97.5% and coagulated solid content was 0.4%.

Then, the reaction solution was coagulated with an aqueous calcium chloride solution and washed to obtain a powdery thermoplastic transparent resin. The thermoplastic transparent resin thus obtained had an index of refraction of 1.518 and a weight average molecular weight of 90,000.

Preparation Example 7

Preparation of MBS (2)

100 parts by weight of ion exchange water, 1 part by weight of sodium dodecylbenzene sulfonate as an emulsifying agent, 30 parts by weight of methyl methacrylate, 10 parts by weight of styrene, 0.4 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 60 parts by weight of a polybutadiene latex polymer (gel content of 70% and average particle size of 3000 Å) at 75° C. for 3 hours and the components were reacted. After reaction, the reaction solution was heated to 80° C. and aged for one hour and the reaction was finished. At this time, a polymerization conversion ratio was 98.0% and coagulated solid content was 0.2%.

Then, the reaction solution was coagulated with an aqueous calcium chloride solution and washed to obtain a powdery thermoplastic transparent resin. The thermoplastic transparent resin thus obtained had an index of refraction of 1.518 and a weight average molecular weight of 90,000.

Preparation Example 8

Preparation of MBS (3)

100 parts by weight of ion exchange water, 1 part by weight of sodium dodecylbenzene sulfonate as an emulsifying agent, 20 parts by weight of methyl methacrylate, 9 parts by weight of styrene, 6 parts by weight of polyethylene glycol (1000) monomethylether methacrylate, 5 parts by weight of acrylic acid, 0.4 part by weight of tertiary dodecyl mercaptan, 0.048 part by weight of sodium formaldehyde sulfoxylate, 0.012 part by weight of sodium ethylenediaminetetraacetate, 0.001 part by weight of ferrous sulfate and 0.04 part by weight of cumene hydroperoxide were continuously added to 60 parts by weight of a polybutadiene latex polymer (gel content of 70% and average particle size of 3000 Å) at 75° C. for 3 hours and the components were reacted. After polymerization for 2 hours, the latex completely lost stability, thus forming an agglomerate. At this time, the reaction was completed.

Preparation Example 9

Preparation of MSAN Resin (1)

A mixture of 68 parts by weight of methyl methacrylate, 22 parts by weight of styrene, 10 parts by weight of acrylonitrile, 30 parts by weight of toluene as a solvent and 0.15 part by weight of t-dodecyl mercaptan as a molecular weight modifier was continuously added as a starting material to a reaction vessel over an average reaction time of three hours and allowed to maintain at a reaction temperature of 148° C. The polymerization solution separated from the reaction vessel was heated in a pre-heating chamber and unreacted monomer was volatilized in a volatilization chamber.

Then, a pellet-form copolymer was prepared using a polymer transfer pump extruder at a temperature of 210° C. The copolymer thus obtained had an index of refraction of 1.518 and a weight average molecular weight of 100,000.

Preparation Example 10

Preparation of MSAN Resin (2)

A mixture of 68 parts by weight of methyl methacrylate, 22 parts by weight of styrene, 7 parts by weight of acrylonitrile, 3 parts by weight of methacrylic acid, 30 parts by weight of toluene as a solvent and 0.15 part by weight of t-dodecyl mercaptan as a molecular weight modifier was continuously added as a starting material to a reaction vessel over an average reaction time of three hours and allowed to maintain at a reaction temperature of 148° C. The polymerization solution separated from the reaction vessel was heated in a pre-heating chamber and unreacted monomer was volatilized in a volatilization chamber.

Then, a pellet-form copolymer was prepared using a polymer transfer pump extruder at a temperature of 210° C. The copolymer thus obtained had an index of refraction of 1.518 and a weight average molecular weight of 100,000.

Comparison of Examples 1-4 with Comparative Examples 1-4

The thermoplastic resins of Preparation Examples 1 to 10 were mixed at the contents as set forth in the following Table 1 (graft copolymer alone) and Table 2 (a mixture of graft copolymer with MSAN resin), 0.3 part by weight of a lubricant and 0.2 part by weight of an antioxidant were added thereto and pellet-form copolymers were prepared at a cylinder temperature of 220° C. using a twin screw extruder.

<Measurement>

The pellets were injected to prepare samples and the physical properties of the samples were measured in accordance with the following method.

Haze: Haze was evaluated from a haze value of a 3 mm sheet measured in accordance with ASTM D-1003.

Total Transmittance: Total transmittance of 3 mm sheet was measured in accordance with ASTM D-1003.

color (b value): Hunter Lab of 3 mm sheet was measured with a Color Quest II machine. As the value b increases, color becomes closer to yellow, and as the value b approaches 0, color becomes close to natural color.

The results of measured physical properties are summarized in the following Table 2.

TABLE 2

|  | Haze | Total Transmittance (Tt) | B value |
| --- | --- | --- | --- |
| Ex. 1 (mixture) | 0.6 | 92 | 0.5 |
| Ex. 2 (mixture) | 0.8 | 92 | 0 |
| Ex. 3 (alone) | 1.9 | 90.1 | 0.2 |
| Ex. 4 (mixture) | 1.6 | 90.3 | 0.5 |
| Comp. Ex. 1 (alone) | 3.0 | 89.4 | 2.5 |
| Comp. Ex. 2 (alone) | | Non-transparent | |
| Comp. Ex. 3 (mixture) | 15.4 | 90.5 | 3.0 |
| Comp. Ex. 4 (alone) | | Polymerization impossible | |

As can be seen from Table 2, Example 3 in which the graft copolymer (MABS resin) was used alone and Examples 1, 2 and 4 in which a graft copolymer was mixed with an MSAN resin had a considerably low haze of 2.0 or less, high total transmittance (Tt) and a low b value due to polymerization using a hydrophilic monomer.

On the other hand, it can be seen that Comparative Example 1 in which a graft copolymer (MABS resin) was used alone and Comparative Example 3 in which a graft copolymer (MBS resin) was mixed with an MSAN resin had high total transmittance, but had a high haze value and relatively high b value due to lack of use of a hydrophilic monomer, thus not being preferable.

TABLE 1

|  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 | Prep. Ex. 9 | Prep. Ex. 10 |
| --- | --- | --- | --- | --- | --- | --- | --- | --- | --- | --- |
| Ex. 1 (mixture) | 20 | | | | | | | | 80 | |
| Ex. 2 (mixture) | | 30 | | | | | | | 70 | |
| Ex. 3 (alone) | | | 100 | | | | | | | |
| Ex. 4 (mixture) | | | | | 30 | | | | | 70 |
| Comp. Ex. 1 (alone) | | | | 100 | | | | | | |
| Comp. Ex. 2 (alone) | | | | | | 100 | | | | |
| Comp. Ex. 3 (mixture) | | | | | | | 30 | 70 | | |
| Comp. Ex. 4 (alone) | | | | | | | | | 100 | |

In addition, in Comparative Example 2 in which the graft copolymer (MABS resin) was used alone, index of refraction between the conjugated diene rubber and graft copolymer was not balanced and the range of styrene used was out of a preferred range, thus disadvantageously obtaining a non-transparent resin.

In addition, in Comparative Example 4 in which the graft copolymer (MBS resin) was used alone, excessive hydrophilic monomers were present during graft copolymerization, latex stability was thus deteriorated and as a result, polymerization was not performed. That is, the amount of hydrophilic monomer was limited, since latex stability was deteriorated when a large amount of hydrophilic monomer was used.

The invention claimed is:

1. A thermoplastic transparent resin composition comprising a graft copolymer (A) and a bulk copolymer (B) in a weight ratio of 20:80 to 70:30,
   wherein the graft copolymer (A) comprises 50 to 60 parts by weight of a conjugated diene rubber polymer (a), 28 to 34 parts by weight of a first (meth)acrylic acid alkyl ester monomer (b), 10 to 12 parts by weight of a first-aromatic vinyl monomer (c), 0.5 to 2 parts by weight of a first hydrophilic monomer (d), and 0.1 to 5 parts by weight of an emulsifying agent, based on 100 parts by weight of the sum of (a), (b), (c) and (d),
   wherein the bulk copolymer (B) comprises 20 to 30 parts by weight of a second aromatic vinyl monomer, 7 to 10 parts by weight of a vinyl cyan monomer, 65 to 70 parts by weight of a second (meth)acrylic acid alkyl ester monomer, and 0.5 to 4 parts by weight of a second hydrophilic monomer, based on 100 parts by weight of the bulk copolymer (B),
   wherein each of the first and second hydrophilic monomer is one or more selected from the group consisting of ethoxyethoxy ethyl acrylate, ethoxy triethylene glycol methacrylate, polyethylene glycol (400) monomethyl ether acrylate, polyethylene glycol (1000) monomethyl ether acrylate, polyethylene glycol (400) monomethyl ether methacrylate, polyethylene glycol (1000) monomethyl ether methacrylate, polyethylene glycol dimethacrylate, polyethylene glycol diacrylate, polyethylene glycol allyl acrylate, polyethylene glycol monoacrylate, polyethylene glycol monomethacrylate, polyethylene glycol monoallyl, and (meth)acrylic acid,
   wherein a color (b value, as measured by HunterLabs Color Quest II spectrophotometer) of the thermoplastic transparent resin composition is 0 to 0.5, and
   wherein the emulsifying agent is one or more selected from the group consisting of sodium alkylbenzene sulfonate, potassium alkylbenzene sulfonate, potassium alkylcarboxylate, sodium alkylsulfate, potassium alkylsulfate, sodium alkyldicarboxylate, potassium alkyldicarboxylate, sodium alkylether sulfonate, potassium alkylether sulfonate, sodium alkylethersulfate, potassium alkylethersulfate, ammonium allyloxynonylphenoxypropan-2-yloxymethylsulfate and reactive emulsifying agents.

2. The thermoplastic transparent resin composition according to claim 1 wherein the conjugated diene rubber polymer (a) has a gel content of 70% and mean average size of 3000 Å, or a gel content of 90% and mean average size of 1500 Å.

3. The thermoplastic transparent resin composition according to claim 1, wherein the thermoplastic transparent resin composition has a total transmission (Tt), as measured by ASTM D-1003, of 90.3 to 92.

4. A thermoplastic transparent resin composition comprising a graft copolymer (A) and a bulk copolymer (B) in a weight ratio of 20:80 to 30:70,
   wherein the graft copolymer (A) comprises 50 to 60 parts by weight of a conjugated diene rubber (a), 28 to 34 parts by weight of a first (meth)acrylic acid alkyl ester monomer (b), 10 to 12 parts by weight of a first aromatic vinyl monomer (c), 0.5 to 2 parts by weight of a hydrophilic monomer (d), 2.5 to 3 parts by weight of a first vinyl cyan monomer (e), and 0.1 to 5 parts by weight of an emulsifying agent, based on 100 parts by weight of the sum of (a), (b), (c), (d) and (e),
   wherein the bulk polymer (B) comprises 20 to 30 parts by weight of a second aromatic vinyl polymer, 7 to 10 parts by weight of a second vinyl cyan monomer, and 65 to 70 parts by weight of a second (meth)acrylic acid alkyl ester monomer,
   wherein each of the first and second hydrophilic monomers is one or more selected from the group consisting of ethoxyethoxy ethyl acrylate, ethoxy triethylene glycol methacrylate, polyethylene glycol (400) monomethyl ether acrylate, polyethylene glycol (1000) monomethyl ether acrylate, polyethylene glycol (400) monomethyl ether methacrylate, polyethylene glycol (1000) monomethyl ether methacrylate, polyethylene glycol dimethacrylate, polyethylene glycol diacrylate, polyethylene glycol allyl acrylate, polyethylene glycol monoacrylate, polyethylene glycol monomethacrylate, polyethylene glycol monoallyl, and (meth)acrylic acid,
   wherein a color (b value, as measured by HunterLabs Color Quest II spectrophotometer) of the thermoplastic transparent resin composition is 0 to 0.5, and
   wherein the emulsifying agent is one or more selected from the group consisting of sodium alkylbenzene sulfonate, potassium alkylbenzene sulfonate, potassium alkylcarboxylate, sodium alkylsulfate, potassium alkylsulfate, sodium alkyldicarboxylate, potassium alkyldicarboxylate, sodium alkylether sulfonate, potassium alkylether sulfonate, sodium alkylethersulfate, potassium alkylethersulfate, ammonium allyloxynonylphenoxypropan-2-yloxymethylsulfate and reactive emulsifying agents.

5. The thermoplastic transparent resin composition according to claim 4, wherein the conjugated diene rubber polymer (a) has a gel content of 70% and mean average size of 3000 Å, or a gel content of 90% and mean average size of 1500 Å.

6. The thermoplastic transparent resin composition according to claim 4, wherein the thermoplastic transparent resin composition has a total transmittance (Tt), as measured by ASTM D-1003, of 90.3 to 92.

* * * * *